HORACE HOLTON.
Improvement in Carbureters.
No. 125,194.                           Patented April 2, 1872.
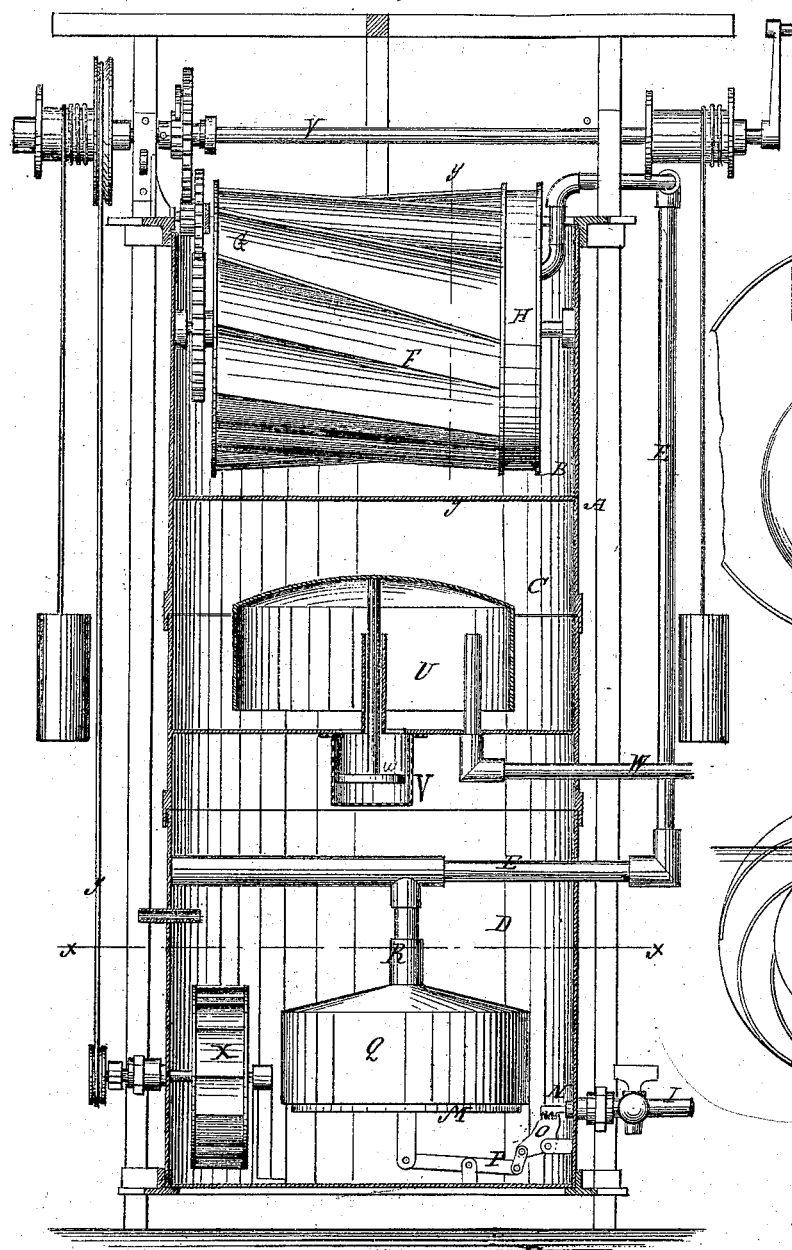
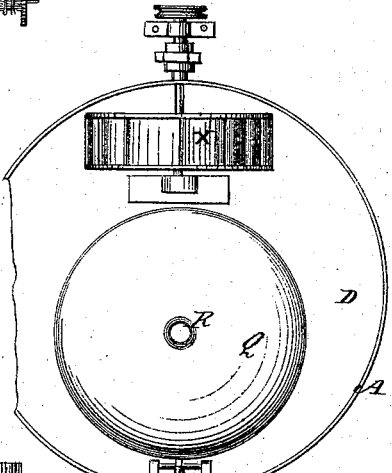
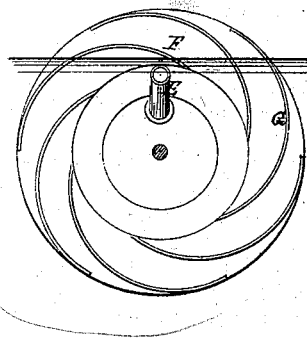
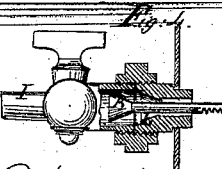

UNITED STATES PATENT OFFICE.

HORACE HOLTON, OF ST. LOUIS, MISSOURI.

IMPROVEMENT IN CARBURETERS.

Specification forming part of Letters Patent No. 125,194, dated April 2, 1872.

Specification describing an Improved Carbureter, invented by HORACE HOLTON, of St. Louis, in the county of St. Louis and State of Missouri.

My invention relates to certain improvements in machines for carbureting air, which will be first fully described and then clearly pointed out in claims.

Figure 1 is a sectional elevation of the improved machine. Fig. 2 is a horizontal section taken on the line $x\ x$. Fig. 3 is a section of the air compressing-wheel, taken on the line $y\ y$ of Fig. 1. Fig. 4 is a sectional elevation of the automatic feed apparatus.

A is the cylindrical shell of the apparatus, which is divided into the air-compressing chamber B, gas-chamber C, and the gasoline-chamber D. The air is to be forced into the gasoline-chamber and the mixers therein through the pipe E by the water-wheel F, consisting of the cycloidal buckets G and the air-chamber H at one end, into the top of which the air is forced, as indicated in Fig. 3, and into which the pipe E extends above the level of the water to receive the air when so pressed in.

My invention in this wheel consists in the cycloidal spiral buckets, which are better adapted, by reason of their peculiar form and arrangement, and the number used, say about eight, more or less, to produce a regular and continuous pressure and flow of air, which has heretofore been irregular in these machines by reason of the use of square-shaped buckets of large capacity and few in number, which cause the air to flow in gusts.

The gasoline is introduced to the chamber D through the main pipe I, in which I have provided a conical valve, K, with a seat, L, to regulate the flow automatically by the action of a float, M. Said valve closes when moving inward, and the stem N, which projects into the chamber, has a few cog-teeth gearing with similar teeth on the end of a short lever, O, which is connected by a link to one end of a lever, P, the other end of which is connected to the float, all being arranged in such manner that when the float falls the valve will be pushed outward and opened and the gasoline will flow in, and when it rises the valve will be closed. Any suitable arrangement of levers and connections may be used for connecting the float with the valve-stem to cause it to operate in this way, and I do not limit myself to the particular devices herein shown. For mixing the air with the gasoline I attach an inverted holder, Q, to the float M, inclosing said float nearly to the bottom with a narrow space between it and said float, so that the edge of the holder will be submerged in the gasoline and discharge the air into said holder, using a telescopic pipe-connection, R, to allow the holder and float to rise and fall as required. This drives the air into a thin hollow cylindrical column, surrounding the float and entering the gasoline in a diffused condition very favorable to the necessary union. From the chamber D the air and gasoline vapor ascend to the gas-holder U through the perforated cylinder V, which mixes them more, and from this holder the gas passes to the burners through the pipe W. The holder U is provided with a piston, $u$, which descends into the side-perforated chamber V, and when raised to its maximum height closes the valve-seat $v$ and prevents any further ingress of gas. This excludes the possibility of the gas reaching the upper and other parts of chamber C, from whence it could not descend into pipe W. For increasing the vaporization of the gasoline in cold weather I propose to arrange a water-wheel, X, in the gasoline-chamber for agitating the gasoline, which facilitates the action desired; and I cause the movement of the said wheel by a belt, Y, driven by shaft Z, which actuates the water-wheel, which is actuated by weights and cords, and is wound up for resetting in the usual way. This wheel is constructed in the form of an overshot-wheel, and driven in the direction to carry the fluid over and let it fall again in such manner as to agitate it very thoroughly.

Having thus described my invention, I claim as new and desire to secure by Letters Patent—

1. The combination of agitating-wheel X with gasoline-chamber, as and for the purpose described.

2. The perforated cylinder V and pistoned gas-holder U, arranged respectively in the two adjacent chambers C D, as and for the purpose described.

HORACE HOLTON.

Witnesses:
 EWD. H. HOLTON,
 SAM. M. BRAUNER.